March 19, 1963    N. H. RUDOLPH ETAL    3,082,023
ELECTRICAL OUTLET BOX CABLE CLAMP
Filed Feb. 20, 1961
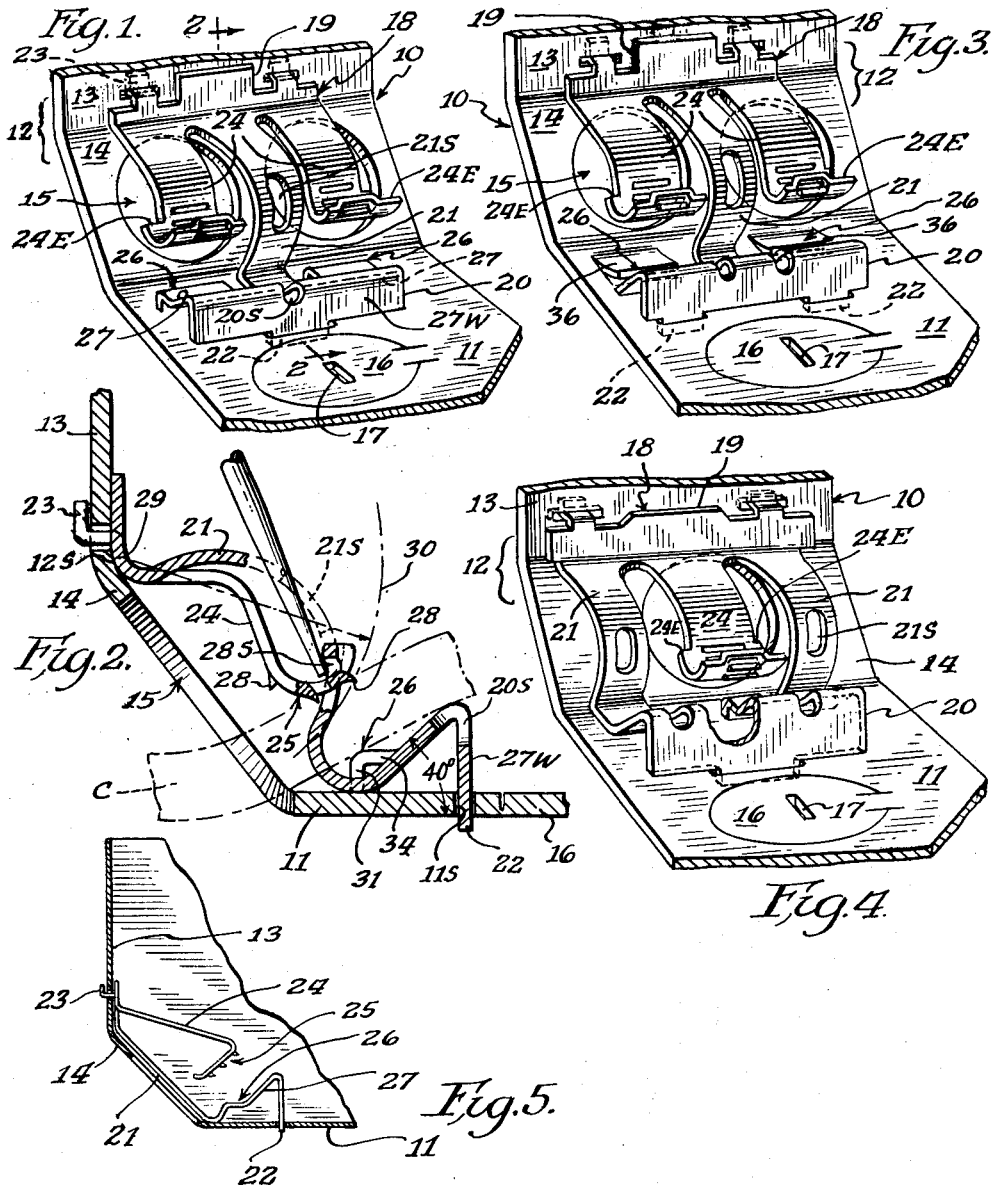
Inventors
Nathan H. Rudolph
and Richard H. Crutchett
By
Mann, Brown and McWilliams.
Attys.

United States Patent Office 3,082,023
Patented Mar. 19, 1963

3,082,023
ELECTRICAL OUTLET BOX CABLE CLAMP
Nathan H. Rudolph and Richard H. Crutchett, Aurora, Ill., assignors to All-Steel Equipment Inc., a corporation of Illinois
Filed Feb. 20, 1961, Ser. No. 90,906
6 Claims. (Cl. 285—128)

This invention relates to improvements in a clamp for use in securing a non-metallic electrical cable in an electrical outlet box.

This application is filed as a continuation-in-part and is in part a division of our copending application Serial No. 854,950, filed November 23, 1959, now abandoned, and that disclosure to the extent that it is not inconsistent herewith is specifically incorporated by reference.

Paige Patent No. 2,556,977 illustrates a clamp for mounting within an electrical outlet box of rectangular configuration in association with a knockout opening thereof for restraining a cable projecting through the knockout opening. While the clamp construction of the Paige patent has found wide use with outlet boxes of rectangular configuration, its application to a beveled outlet box for association with a knockout in an oblique wall thereof has not provided a satisfactory arrangement for restraining a cable.

A general object of the invention is to provide an improved cable clamp to be used in combination with an electric outlet or switch box of the beveled type in which the clamp may be secured to span the oblique wall of the box and reliably restrain a cable passing through such oblique wall.

A more specific object of the invention is to provide an improved outlet or switch box of the beveled type and a cooperating clamp which clamp is constructed of resilient material and is adapted to lock into the outlet box and to engage and retain an electrical cable in position in the box.

Another object of the invention is to provide an integral one-piece spring metal clamp secured in a beveled outlet or switch box in alignment with a knockout hole in an oblique wall of the box and provided with resilient means for engaging a cable passing through the knockout hole.

A more specific object of the invention is to provide a cable clamp, for use in combination with a beveled outlet box, in which the cable is positioned and held at lengthwise spaced points thereon to prevent tipping of the cable in the clamping assembly and loosening of the cable thereby.

Another object of the invention is to provide a cable clamp in which the retaining members include a resilient contacting finger having substantial flexibility and in which is provided an off-set or a slot so that a tool may be used to pry up and disengage the finger from the conduit to allow convenient repositioning or replacement of the conduit in the outlet box.

Still another object of the invention is to provide a cable clamp for individual association with a single knockout.

These and other objects and advantages will be apparent from a consideration of the preferred forms of the invention which are shown by way of illustration in the accompanying drawings, wherein:

FIG. 1 is a fragmentary perspective view of the cable clamp secured in a beveled outlet box;

FIG. 2 is a sectional view taken on the line 2—2 of FIG. 1;

FIG. 3 is a view similar to that of FIG. 1, but showing a modified form of the invention;

FIG. 4 is a perspective view of an electrical outlet or switch box having a modified clamp for receiving a single cable; and FIG. 5 is a side sectional view through a beveled box showing in elevation a modified form of the invention in which the clamp has a mounting strip that follows the contour of the walls of the beveled box.

Referring to the drawings, in FIGS. 1 to 4 there is illustrated a portion of a beveled outlet box 10 of the type which comprises a bottom wall 11, two straight side walls (not shown) and two end walls 12 each consisting of a straight portion 13 and an oblique portion 14. At least the oblique wall portion 14 and the bottom 11 of the box are provided with knockout holes 15 initially filled with blanks 16 which are provided with rectangular slots 17 for accommodating the end of a screwdriver by means of which the blanks may be removed from the box in the conventional manner.

The improved clamp or connector 18 of the invention is specifically constructed for use with a beveled box and when installed in the box, it clamps and holds in position cables inserted through separate knockout holes in the oblique wall of the box. In FIG. 2, a cable C is illustrated in clamped position.

A double cable type connector assembly is illustrated in FIG. 1 as comprising the beveled outlet box 10 having the one piece clamp 18 fixed in place therein and overlying the pair of knockout holes 15 in the oblique wall 14 of the box. The clamp is preferably a metal stamping of spring steel or similar material and includes spaced apart end and base sections 19 and 20 connected by a single curved resilient strap 21 and provided, respectively, with a single straight tongue 22 and a pair of angular tongues 23 for anchoring within slots 11S and 12S in the bottom wall 11 and end wall 12 of the outlet box. A pair of flexibly swingable spring fingers 24 extend in transversely spaced relation from one side of the end section 19 and adjacent their free ends, each is shaped to provide a cable gripping jaw 25. Correspondingly, the base section 20 provides a pair of stationary jaws 26 along one side thereof that are opposed to and cooperate with the gripping jaws of the spring fingers. In addition, the base section provides a pair of locating walls 27, one for each cooperating set of jaws, preferably extending in the direction generally normal to the plane of the oblique wall 14 of the box. This locating wall 27 in conjunction with the jaws 25 and 26 trains the cable along a line generally normal to the oblique wall and in addition stabilizes the cable against tipping and is of crucial importance to a clamp for use in a beveled box.

To mount the clamp within the box the angular tongues 23 are first engaged within the slots 12S in the end wall and the clamp is distorted sufficiently by flexing the resilient strap 21 until the straight tongue enters the slot in the bottom wall of the box. Upon release, the clamp springs back and locks in position with the jaw sets disposed across the knockouts for receiving a cable introduced endwise through one of the knockout holes. Slot 21S in the resilient strap and slot 20S at the connection of the resilient strap to the base section provide increased resilience and flexibility for facilitating distortion of the clamp during its assembly into the box.

Each spring finger in the preferred arrangement of FIG. 1 is curved and bowed and has an effective pivot point as indicated at 29 in FIG. 2 so that its jaw 25 swings along the line of the arc designated 30 in FIG. 2 and approaches the stationary jaw 26 in a gradual fashion as the finger swings towards the oblique wall. It is also apparent that the arc 30 described by swinging movement of the finger 24 towards the oblique wall 14 is convergent to the line along which the cable is trained by the action of the clamp. The jaw defining section of each finger is provided with serrations 28 which importantly enhance the gripping action. The outermost serration is deformed and enlarged to form a slot 28S capable of receiving the tip end of a screwdriver which is shown in FIG. 2 in position for prying the spring finger free from engagement with the cable to facilitate repositioning or removal thereof. Each spring finger also has a side edge off-set 24E affording a second prying point for disengaging the finger from the cable and this edge off-set is engageable by positioning the screwdriver in the same position as that illustrated in FIG. 2. Thus, the two separate prying points afford two different access locations for prying to allow for the possibility that clearance at one location might be unavailable.

As best shown in FIG. 2, the base of the clamp comprises a step portion 31 integrally merging with the locating wall. The step engages and overlies base wall 11 of the outlet box and defines a riser which is shown essentially perpendicular to the base of the outlet box, although the angle is not critical, and a thread 34 or flat portion which is shown as parallel to the base of the box, but the angle is not critical. The "riser" and "tread" define the stationary jaw 26.

The locating wall 27 extends angularly upwardly from the "tread" 34 of the step 31 and as illustrated lies in a plane essentially perpendicular to the plane of the oblique wall 14 of the box. At its upper end the locating wall merges with a vertical support wall 27W which engages the bottom wall of the box.

Although the linear extent of the locating wall is not critical it must be sufficient in cooperation with the stationary jaw and spring finger to stabilize the line of the cable against tipping such as would lead to loosening of the grip exerted on the cables by the clamp.

The disposition of the locating wall is, in the case of the beveled box of FIG. 1, preferably in a plane which is generally normal to the plane of the oblique wall 14, or, for the particular manufacture of beveled box shown, approximately 40° with respect to the base of the box. The angle may be somewhat greater than the 40° shown (see FIG. 2) for the preferred embodiment of the cable clamp, but an angle appreciably smaller would present a locating wall separating from the spring finger 20 to such an extent as to impair the cooperation of the spring finger 20 with the locating wall 27 and the stationary jaw 26.

A modified form of the invention is shown in FIG. 3. This modification differs from that shown in FIG. 1 in that the base section 20 of the clamp does not include structure for providing the stationary jaws 26. The stationary jaw appears in FIG. 2 as a raised section 36 punched from the wall of the outlet box itself. In the structure of FIG. 3, the base section carries two straight mounting tongues 22 for engagement in the bottom wall.

Another modification of the invention is shown in FIG. 4 which represents a cable clamp assembly adapted for use with a single knockout hole. In this construction, it will be seen that the clamp has a single flexible finger 24 spanning the knockout and a pair of resilient straps 21 flanking the finger.

In all of the foregoing arrangements, the original insertion of the cable sets up a force on the clamp that acts generally along the 40° angle of incline of the oblique wall and tends to lift the tongues 22 out of the mounting slots in the bottom box wall 11. This problem is particularly evident in the case of larger diameter cables and it can result in actual dislodgment of the clamp.

To prevent such dislodgment the straight tongues 22 are formed at their lateral extremities with outwardly bent integral lips 22L that are engageable under the exterior surface of the wall 11. Since the clamp is flexed during mounting and then tends to spring back the lips 22L are positively engaged against the box wall in a relationship that is particularly effective against forces applied during insertion of the cable.

In the single tongue arrangements of FIGS. 1, 2 and 4, lips 22L are provided at both ends of the tongue 22 while in the double tongue arrangement of FIG. 3 each tongue 22 is provided with a single lip 22L.

The side sectional view depicted in FIG. 5 represents a modification of the invention illustrating that the resilient strap 21 which is shown as a curved member may also take the form of an angular strap that follows the contour of the box walls. FIG. 5 also illustrates a spring finger 24 of angular configuration as distinguished from the curved and bowed spring fingers of the previous embodiments.

The foregoing description and the drawings are given merely to explain and illustrate the invention, and the manner in which it may be performed, and the invention is not to be limited thereto except insofar as the appended claims are so limited since those skilled in the art who have our disclosure before them will be able to make modifications and variations therein without departing from the scope and spirit of the invention.

We claim:

1. A connector assembly for securing an electrical cable against endwise movement and comprising an outlet box member having vertical and horizontal walls integrally connected by an oblique wall section having a knockout hole for the cable and a clamp member having end and base sections spaced apart for location at points in said box member on opposite sides of said oblique wall section and connected by a flexibly resilient strap, said clamp member having a flexibly swingable finger integral with said end section and projecting therefrom in a direction extending generally towards the base section for swinging movement towards said oblique wall section, said end and base sections and said box walls having interengaging attachment structure for mounting said clamp member in said box with said connection strap flanking the knockout hole and with the finger at least partially spanning the knockout hole, said connector assembly including means providing a jaw opposed to and spaced from the free end of said finger for gripping the cable therebetween, and a locating wall projecting above said jaw on the side thereof remote from the hole and cooperable with said finger and jaw to engage said cable and train the same along a line generally normal to the plane of the oblique wall section, with said finger when undergoing swinging movement towards the oblique wall section describing an arc that is convergent with the said line along which the cable is trained.

2. In an electrical outlet box and conduit clamp assembly, said outlet box being of the beveled type having vertical and horizontal walls integrally connected by an oblique wall section having a knockout hole for the introduction of a cable therethrough with the walls of said box bounding said knockout hole having slots for securing a cable clamp in said box; a one-piece clamp for securing a non-metallic electrical cable against endwise movement in said outlet box, said clamp comprising end and base sections spaced apart for location on opposite sides of the knockout hole in said oblique wall, said end and base sections being integrally connected by a flexible resilient strap flanking said knockout hole, said end and base sections including tongues for cooperation with the slots in said box to secure said clamp in said box, and a flexibly swingable finger depending from said end section and projecting toward the base section for swinging movement towards said oblique wall, said base section including integrally therewith a bearing edge and a positioning surface opposing said flexibly swingable finger, said edge and surface aligned with and longitudinally spaced from said hole to engage and train a cable inserted through said knockout hole along a line generally normal to said oblique wall section, with said finger when undergoing swinging movement towards said oblique wall section moving into opposed spaced relation to said edge to define therewith a plane of gripping coaction and moving along an arc that is convergent with the line along which the cable is trained, with the tongue of one of said sections being angular for initial insertion in the corresponding box slot and with the tongue of said base section being insertable upon flexing of said clamp after insertion of the angular tongue to project completely through said box and having a tip end thereof projecting obliquely outwardly from the plane thereof to engage against the exterior of said box and lock said clamp against dislodgment from said box by forces applied thereto during insertion of the cable.

3. A clamp for assembly into an outlet box of the type having vertical and horizontal walls integrally connected by an oblique wall that has a knockout hole for receiving a cable to be engaged and secured against endwise movement by the clamp, with the walls of said box bounding said knockout hole having slots for securing the clamp in said box, said clamp having end and base sections spaced for location at points in said box on opposite sides of the oblique wall and integrally connected by a resilient strap, a flexibly swingable finger integral with and projecting from said end section in a direction extending generally towards the base section for swinging movement towards the oblique wall, said end and base sections including tongues for cooperation with the slots in said box to position the clamp therein with its connection strap flanking the knockout hole and with the finger at least partially spanning the knockout hole, said base section having an angular wall providing a jaw opposed to and spaced from the free end of said finger for gripping the cable therebetween and a locating wall projecting above the jaw on the side thereof remote from the knockout hole and cooperable with said finger and jaw to engage the cable and train the same along a line generally normal to the plane of the oblique wall, with said finger when undergoing swinging movement towards said oblique wall moving into opposed spaced relation to said jaw to define therewith a plane of gripping coaction and moving along an arc that is convergent with the line along which the cable is trained, with the tongue of said end section being angular for initial insertion in the corresponding box slot and with the tongue of said base section being insertable upon flexing of said clamp after insertion of the angular tongue to project completely through said box and having a tip end thereof projecting obliquely outwardly from the plane thereof to engage against the exterior of said box and lock said clamp against dislodgment from said box by forces applied thereto during insertion of the cable.

4. A clamp for securement within an outlet box of the type having first and second perpendicular walls integrally connected by an oblique wall portion that has a knockout opening for receiving a flexible cable that is to be anchored to the box by the clamp and that leads up to the box along a line generally parallel to said first wall, with said walls being adapted for anchoring engagement with the clamp, said clamp having base and end sections spaced apart for location adjacent said first wall and said second wall, respectively, at points in said box on opposite sides of the oblique wall portion, said sections being integrally connected in substantially perpendicular relation by a flexibly resilient strap, a flexibly swingable finger integral with and projecting from said end section in a direction extending generally towards the base section for swinging movement thereof towards said oblique wall portion, said base and end sections and said first and second walls, respectively, having interengaging attachment structure for mounting said clamp in said box with said strap flanking the knockout opening and with the finger spanning the knockout opening, said base section having an angular wall portion providing a jaw spaced from and facing the free end of said finger and defining therewith an effective plane of gripping coaction extending generally parallel to the oblique wall portion, and said base section having a locating wall projecting above the jaw on the side thereof remote from the finger and cooperable with said jaw and finger to engage a cable and train the same along a line generally normal to the said plane of gripping coaction, with said finger when undergoing swinging movement towards the said plane of gripping coaction describing an arc that is convergent with the said line along which the cable is trained.

5. The clamp of claim 4 wherein said base section includes a tongue projecting integrally therefrom in a direction generally parallel to said end section for engagement with a registering slot in said first wall of said box, said tongue being insertable through said slot to project beyond said first wall and having a tip end thereof projecting obliquely from the plane thereof to engage externally with said first wall and lock said clamp against dislodgment from said box by forces applied thereto during insertion of the cable inwardly through said knockout opening.

6. A connector assembly for securing a flexible electrical cable against endwise movement and comprising an outlet box of the type having first and second perpendicular walls integrally connected by an intermediate oblique portion that has a knockout opening for receiving the cable, and a clamp member having base and end sections spaced apart for location adjacent said first wall and said second wall, respectively, at points in said box member on opposite sides of the oblique wall portion, said sections being integrally connected in substantially perpendicular relation by a flexibly resilient strap, a flexibly swingable finger integral with and projecting from said end section in a direction extending generally towards the base section for swinging movement thereof towards said oblique wall portion, said base and end sections and said first and second walls, respectively, having interengaging attachment structure for mounting said clamp in said box with said strap flanking the knockout opening and with the finger spanning the knockout opening, said base section having an angular wall providing a jaw spaced from and facing the free end of said finger and defining therewith an effective plane of gripping coaction extending generally parallel to the oblique wall portion, and said base section having a locating wall projecting above the jaw on the side thereof remote from the finger and cooperable with said jaw and finger to engage a cable and train the same along a line generally normal to the said plane of gripping coaction, with said finger when undergoing swinging movement towards the said plane of gripping coaction describing an arc that is convergent with the said line along which the cable is trained.

References Cited in the file of this patent

UNITED STATES PATENTS

| | | |
|---|---|---|
| 1,667,814 | Morgenstern | May 1, 1928 |
| 2,051,129 | Clayton | Aug. 18, 1936 |
| 2,556,977 | Paige | June 12, 1951 |